US012640995B2

(12) United States Patent
Arokkiam

(10) Patent No.: US 12,640,995 B2
(45) Date of Patent: May 26, 2026

(54) SYSTEMS AND METHODS FOR MANAGING MEDIA ACCESS CONTROL (MAC) ADDRESSES IN WIRELESS NETWORKS

(71) Applicant: BRITISH TELECOMMUNICATIONS PUBLIC LIMITED COMPANY, London (GB)

(72) Inventor: Jerome Arokkiam, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 6 days.

(21) Appl. No.: 18/727,458

(22) PCT Filed: Dec. 15, 2022

(86) PCT No.: PCT/EP2022/086247
§ 371 (c)(1),
(2) Date: Jul. 9, 2024

(87) PCT Pub. No.: WO2023/131497
PCT Pub. Date: Jul. 13, 2023

(65) Prior Publication Data
US 2025/0132985 A1 Apr. 24, 2025

(30) Foreign Application Priority Data
Jan. 10, 2022 (GB) ..................................... 2200253

(51) Int. Cl.
*H04L 41/16* (2022.01)
*H04L 41/0823* (2022.01)
(Continued)

(52) U.S. Cl.
CPC .......... *H04L 41/16* (2013.01); *H04L 41/0823* (2013.01); *H04L 41/085* (2013.01); *H04L 41/0866* (2013.01); *H04L 61/5092* (2022.05)

(58) Field of Classification Search
None
See application file for complete search history.

(56) References Cited

U.S. PATENT DOCUMENTS 7,415,535 B1 8/2008 Kuik et al.
8,989,101 B1 3/2015 Mishra
(Continued)

FOREIGN PATENT DOCUMENTS

CN 106060878 A 10/2016
CN 110493363 A 11/2019
(Continued)

OTHER PUBLICATIONS

Martin et al., "A Study of MAC Address Randomization in Mobile Devices and When it Fails", US Naval Academy, Mar. 8, 2017; Proceedings on Privacy Enhancing Technologies 2017; retrieved online from ResearchGate.net on Sep. 10, 2025; DOI: 10.1515/popets-2017-0054 (Year: 2017).*
(Continued)

*Primary Examiner* — Sandarva Khanal
(74) *Attorney, Agent, or Firm* — EIP US LLP

(57) ABSTRACT

A method of analyzing a wireless local area network that includes a plurality of devices, at least one device of the plurality of devices configured to change its Media Access Control (MAC) address, the method including obtaining training data including a plurality of records, the training data specifying, for each record: a MAC address, and a set of performance metrics; training a machine learning model to output a MAC address based on the set of performance metrics; obtaining further data including a plurality of records that includes a set of performance metrics; determining a MAC address for each record of the further data by inputting the set of performance metrics of the further data to the trained machine learning model; and analyzing the set
(Continued)

NMS retrieves data including set of parameters for a second time period (S319)

NMS processes retrieved data to scale each parameter, create vector for each time interval for each MAC address (S321)

NMS applies validated neural network to the vectors to output an identifier for each input vector (S323)

Analyse data using identifiers to identify one or more configurations of the network (S325)

of performance metrics for a plurality of records of the further data having the same determined MAC address.

5 Claims, 11 Drawing Sheets

(51) Int. Cl.

| | |
|---|---|
| *H04L 41/085* | (2022.01) |
| *H04L 41/0866* | (2022.01) |
| *H04L 61/5092* | (2022.01) |

(56) References Cited

U.S. PATENT DOCUMENTS

| | | | |
|---|---|---|---|
| 10,251,049 B2 | 4/2019 | Seidman et al. | |
| 10,862,885 B2 | 12/2020 | Zhang et al. | |
| 10,944,663 B2 * | 3/2021 | Sugatoor | H04L 61/5038 |
| 10,979,848 B1 | 4/2021 | Palappetty et al. | |
| 11,102,843 B2 * | 8/2021 | Chan | H04L 1/1642 |
| 11,902,246 B2 * | 2/2024 | Barton | H04L 61/5076 |
| 12,192,770 B2 * | 1/2025 | Ficara | H04W 12/73 |
| 12,388,782 B2 | 8/2025 | Arokkiam et al. | |
| 12,402,064 B2 | 8/2025 | Arokkiam et al. | |
| 2002/0031101 A1 | 3/2002 | Petite et al. | |
| 2005/0044273 A1 * | 2/2005 | Bouchat | H04L 61/2503 |
| | | | 709/245 |
| 2007/0201490 A1 | 8/2007 | Mahamuni | |
| 2008/0031185 A1 | 2/2008 | Bims | |
| 2009/0265455 A1 | 10/2009 | Hiraki | |
| 2010/0165910 A1 | 7/2010 | Mathews et al. | |
| 2011/0191827 A1 | 8/2011 | Balay | |
| 2012/0155473 A1 | 6/2012 | Figueira et al. | |
| 2013/0237242 A1 | 9/2013 | Oka et al. | |
| 2014/0098705 A1 | 4/2014 | Chow et al. | |
| 2015/0009901 A1 | 1/2015 | Gorajala Chandra et al. | |
| 2016/0081009 A1 | 3/2016 | Tailor et al. | |
| 2016/0131733 A1 | 5/2016 | Do et al. | |
| 2016/0330165 A1 | 11/2016 | Jeanne et al. | |
| 2017/0237773 A1 * | 8/2017 | Wallace | H04L 9/0643 |
| | | | 726/22 |
| 2017/0347301 A1 | 11/2017 | Stationwala et al. | |
| 2018/0027399 A1 | 1/2018 | Seidman et al. | |
| 2019/0318028 A1 | 10/2019 | Cao et al. | |
| 2019/0334806 A1 * | 10/2019 | Sugatoor | H04L 43/10 |
| 2020/0344203 A1 * | 10/2020 | Mermoud | H04L 61/5014 |
| 2021/0112097 A1 | 4/2021 | Jiang et al. | |
| 2021/0266319 A1 * | 8/2021 | Olshansky | H04W 12/71 |
| 2021/0337460 A1 * | 10/2021 | Breaux, III | H04W 8/18 |
| 2021/0409316 A1 | 12/2021 | Seshan et al. | |
| 2022/0200950 A1 * | 6/2022 | Sekar | H04W 12/06 |
| 2022/0382611 A1 * | 12/2022 | Kapish | G06F 11/0709 |
| 2023/0091127 A1 * | 3/2023 | Lin | H04W 8/02 |
| | | | 455/432.1 |
| 2023/0199669 A1 * | 6/2023 | Vannithamby | H04W 52/06 |
| | | | 455/127.1 |
| 2023/0209390 A1 * | 6/2023 | Zeng | H04W 24/02 |
| 2024/0381096 A1 | 11/2024 | Beg et al. | |

FOREIGN PATENT DOCUMENTS

| | | | | | |
|---|---|---|---|---|---|
| CN | 108667951 B | | 4/2021 | | |
| EP | 3174363 A1 | | 5/2017 | | |
| EP | 3928483 B1 | * | 1/2023 | | H04W 12/02 |
| EP | 4178160 A1 | * | 5/2023 | | H04W 24/08 |
| KR | 20200038731 A | | 4/2020 | | |
| WO | WO-2014189462 A1 | * | 11/2014 | | H04W 60/00 |
| WO | 2021104657 A1 | | 6/2021 | | |
| WO | 2022029415 A1 | | 2/2022 | | |
| WO | WO-2022039669 A1 | * | 2/2022 | | H04W 24/10 |
| WO | WO-2022162438 A1 | * | 8/2022 | | G06N 3/045 |
| WO | WO-2022225714 A1 | * | 10/2022 | | H04L 41/0816 |
| WO | 2023131496 A1 | | 7/2023 | | |
| WO | 2023131497 A1 | | 7/2023 | | |
| WO | 2023241856 A1 | | 12/2023 | | |

OTHER PUBLICATIONS

Yu et al., "You Are What You Broadcast: Identification of Mobile and IoT Devices from (Public) WiFi"; USENIX Association; Proceedings of the 29th USENIX Security Symposium; Aug. 12-14, 2020; Retrieved online from https://www.usenix.org/system/files/sec20-yu.pdf on Sep. 10, 2025 (Year: 2020).*

Prasad et al. , "A Case Study on the Monitor Mode Passive Capturing of WLAN Packets in an On-the-Move Setup"; published Nov. 9, 2021; Digital Object Identifier 10.1109/ACCESS.2021.3127079; Retrieved online on Sep. 10, 2025 from IEEE Xplore. (Year: 2021).*

Vanhoef et al., "Why MAC Address Randomization is not Enough: An Analysis of Wi-Fi Network Discovery Mechanisms"; DOI: http://dx.doi.org/10.1145/2897845.2897883; Retrieved online on Sep. 10, 2025 from https://papers.mathyvanhoef.com/asiaccs2016.pdf (Year: 2016).*

Extended European Search Report received for European Patent Application No. 22178706.2, mailed on Oct. 13, 2022, 6 pages.

Extended European Search Report received for European Patent Application No. 22178707.0, mailed on Nov. 16, 2022, 8 pages.

Intention to Grant received for Great Britain Patent Application No. 2208625.0, mailed Apr. 4, 2024, 2 pages.

Intention to Grant received for Great Britain Patent Application No. 2208631.8, mailed May 20, 2024, 2 pages.

International Preliminary Report on Patentability received for PCT Patent Application No. PCT/EP2022/086246, mailed on Dec. 18, 2023, 15 pages.

International Preliminary Report on Patentability received for PCT Patent Application No. PCT/EP2022/086247, mailed on Mar. 22, 2024, 16 pages.

International Preliminary Report on Patentability received for PCT Patent Application No. PCT/EP2023/061926, mailed on Apr. 2, 2024, 11 pages.

International Search Report and Written Opinion received for PCT Patent Application No. PCT/EP2023/061926, mailed on Jul. 21, 2023, 10 pages.

International Search Report and Written Opinion received for PCT Patent Application No. PCT/EP2022/086246, mailed on Apr. 5, 2023, 15 pages.

International Search Report and Written Opinion received for PCT Patent Application No. PCT/EP2022/086247, mailed on Mar. 16, 2023, 12 pages.

International Search Report and Written Opinion received for PCT Patent Application No. PCT/EP2023/061913, mailed on Aug. 10, 2023, 14 pages.

Office Action received for Great Britain Patent Application No. 2200251.3, mailed on Jan. 18, 2023, 3 pages.

Office Action received for Great Britain Patent Application No. 2200251.3, mailed on Jul. 1, 2022, 6 pages.

Office Action received for Great Britain Patent Application No. 2200253.9, mailed on Jan. 18, 2023, 3 pages.

Office Action received for Great Britain Patent Application No. 2200253.9, mailed on Jul. 1, 2022, 5 pages.

Office Action received for Great Britain Patent Application No. 2208625.0, mailed on Jul. 12, 2023, 3 pages.

Office Action received for Great Britain Patent Application No. 2208625.0, mailed on Nov. 3, 2022, 5 pages.

Search Report received for Great Britain Application No. 2208631.8, mailed on Nov. 2, 2022, 4 pages.

Written Opinion of the International Preliminary Examining Authority received for PCT Patent Application No. PCT/EP2022/086247, mailed on Nov. 29, 2023, 9 pages.

Akiyama , et al., "A Study on Device Identification from BLE Advertising Packets with Randomized MAC Addresses", IEEE International Conference on Consumer Electronics—Asia, 2021, 4 pages.

Uras , et al., "Wifi Probes Sniffing: An Artificial Intelligence Based Approach for MAC Addresses De-randomization", IEEE 25th Inter-

(56)         References Cited

OTHER PUBLICATIONS national Workshop on Computer Aided Modeling and Design of
Communication Links and Networks, 2020, 6 pages.

* cited by examiner

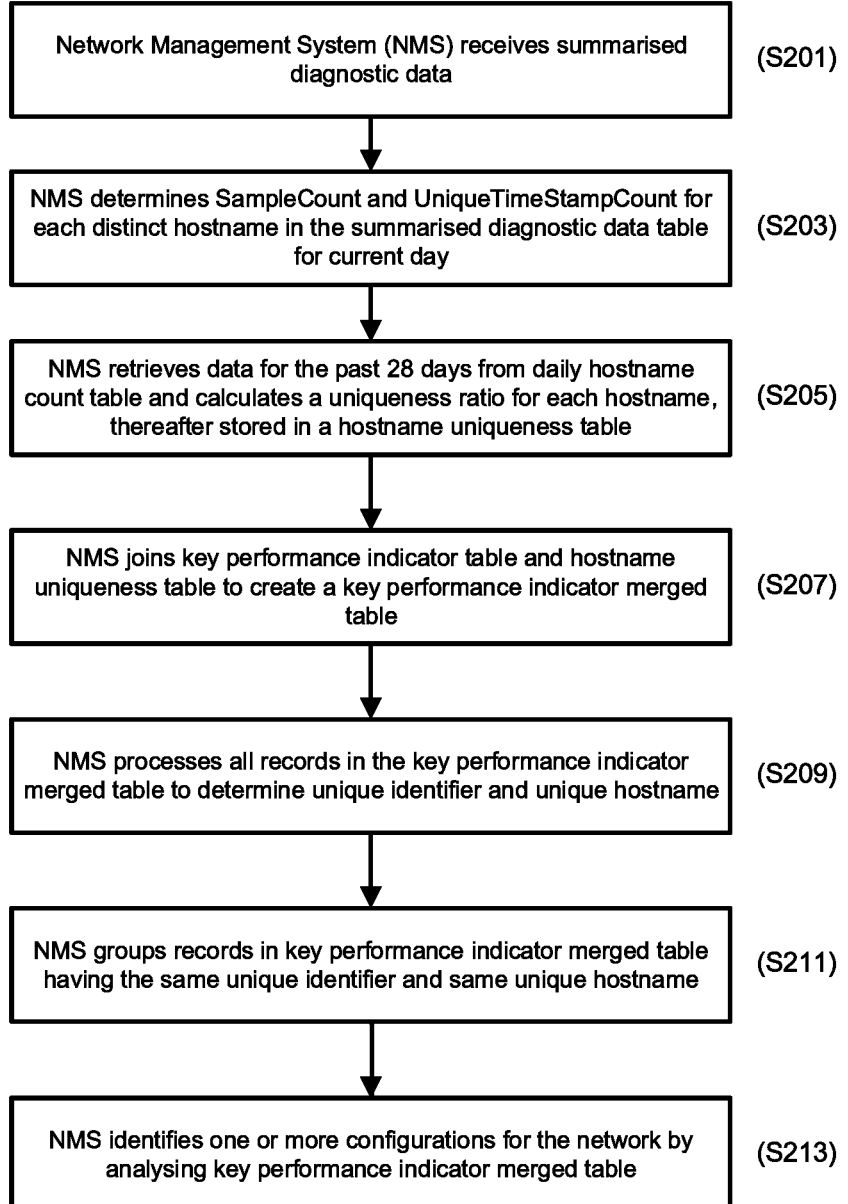

| Network Management System (NMS) receives summarised diagnostic data | (S201) |

| NMS determines SampleCount and UniqueTimeStampCount for each distinct hostname in the summarised diagnostic data table for current day | (S203) |

| NMS retrieves data for the past 28 days from daily hostname count table and calculates a uniqueness ratio for each hostname, thereafter stored in a hostname uniqueness table | (S205) |

| NMS joins key performance indicator table and hostname uniqueness table to create a key performance indicator merged table | (S207) |

| NMS processes all records in the key performance indicator merged table to determine unique identifier and unique hostname | (S209) |

| NMS groups records in key performance indicator merged table having the same unique identifier and same unique hostname | (S211) |

| NMS identifies one or more configurations for the network by analysing key performance indicator merged table | (S213) |

Figure 3

| MAC Address | Date of Record | Host Name | No. of Timestamps with the MAC, Date and Hostname | Total Active Time |
|---|---|---|---|---|
| | | | Daily KPI Table | |
| MAC1 | Day1 | Phone_abc | 24 | 1440 |
| MAC1 | Day2 | Phone_abc | 24 | 1440 |
| MAC1 | Day3 | Phone_abc | 24 | 1440 |
| MAC1 | Day4 | Phone_abc | 24 | 1440 |
| MAC1 | Day5 | Phone_abc | 24 | 1440 |
| MAC1 | Day6 | Phone_abc | 24 | 1440 |
| MAC1 | Day7 | Phone_abc | 24 | 1440 |
| MAC1 | Day8 | Phone_abc | 24 | 1440 |
| MAC1 | Day9 | Phone_abc | 24 | 1440 |
| MAC1 | Day10 | Phone_abc | 24 | 1440 |
| MAC1 | Day11 | Phone_abc | 11 | 660 |
| MAC2 | Day11 | Phone_abc | 14 | 840 |
| MAC2 | Day12 | Phone_abc | 24 | 1440 |
| MAC2 | Day13 | Phone_abc | 24 | 1440 |
| MAC2 | Day14 | Phone_abc | 24 | 1440 |
| MAC2 | Day15 | Phone_abc | 24 | 1440 |
| MAC2 | Day16 | Phone_abc | 24 | 1440 |
| MAC2 | Day17 | Phone_abc | 24 | 1440 |
| MAC2 | Day18 | Phone_abc | 24 | 1440 |
| MAC2 | Day19 | Phone_abc | 13 | 780 |
| MAC3 | Day19 | Phone_abc | 12 | 720 |
| MAC3 | Day20 | Phone_abc | 24 | 1440 |
| MAC3 | Day21 | Phone_abc | 24 | 1440 |
| MAC3 | Day22 | Phone_abc | 24 | 1440 |
| MAC3 | Day23 | Phone_abc | 24 | 1440 |
| MAC3 | Day24 | Phone_abc | 24 | 1440 |
| MAC3 | Day25 | Phone_abc | 24 | 1440 |
| MAC3 | Day26 | Phone_abc | 24 | 1440 |
| MAC3 | Day27 | Phone_abc | 24 | 1440 |
| MAC3 | Day28 | Phone_abc | 24 | 1440 |

Figure 4

| Daily Hostname Count Table | | | |
|---|---|---|---|
| Hostname | CalculationDate | SampleCount | UniqueTimeStampCount |
| Phone_abc | Day1 | 24 | 24 |
| Phone_abc | Day2 | 24 | 24 |
| Phone_abc | Day3 | 24 | 24 |
| Phone_abc | Day4 | 24 | 24 |
| Phone_abc | Day5 | 24 | 24 |
| Phone_abc | Day6 | 24 | 24 |
| Phone_abc | Day7 | 24 | 24 |
| Phone_abc | Day8 | 24 | 24 |
| Phone_abc | Day9 | 24 | 24 |
| Phone_abc | Day10 | 24 | 24 |
| Phone_abc | Day11 | 25 | 24 |
| Phone_abc | Day12 | 24 | 24 |
| Phone_abc | Day13 | 24 | 24 |
| Phone_abc | Day14 | 24 | 24 |
| Phone_abc | Day15 | 24 | 24 |
| Phone_abc | Day16 | 24 | 24 |
| Phone_abc | Day17 | 24 | 24 |
| Phone_abc | Day18 | 24 | 24 |
| Phone_abc | Day19 | 25 | 24 |
| Phone_abc | Day20 | 24 | 24 |
| Phone_abc | Day21 | 24 | 24 |
| Phone_abc | Day22 | 24 | 24 |
| Phone_abc | Day23 | 24 | 24 |
| Phone_abc | Day24 | 24 | 24 |
| Phone_abc | Day25 | 24 | 24 |
| Phone_abc | Day26 | 24 | 24 |
| Phone_abc | Day27 | 24 | 24 |
| Phone_abc | Day28 | 24 | 24 |

Figure 5

| Hostname Uniqueness Table | | | | | |
|---|---|---|---|---|---|
| Hostname | Sum of SampleCount in 28 days | Sum of UniqueTimeStampCount in 28 days | Uniqueness Ratio | IsUnique | CalculationDate |
| Phone_abc | 674 | 672 | 1.00297619 | YES | Day28 |

Figure 6

KPI Merged Table

| MAC Address | Date of Record | Host Name | No. of Timestamps with the MAC, Date and Hostname | Total Active Time | IsUnique | CalculationDate | Unique Identifier | Unique Hostname |
|---|---|---|---|---|---|---|---|---|
| MAC1 | Day1 | Phone_abc | 24 | 1440 | YES | Day28 | MAC3 | Phone_abc |
| MAC1 | Day2 | Phone_abc | 24 | 1440 | YES | Day28 | MAC3 | Phone_abc |
| MAC1 | Day3 | Phone_abc | 24 | 1440 | YES | Day28 | MAC3 | Phone_abc |
| MAC1 | Day4 | Phone_abc | 24 | 1440 | YES | Day28 | MAC3 | Phone_abc |
| MAC1 | Day5 | Phone_abc | 24 | 1440 | YES | Day28 | MAC3 | Phone_abc |
| MAC1 | Day6 | Phone_abc | 24 | 1440 | YES | Day28 | MAC3 | Phone_abc |
| MAC1 | Day7 | Phone_abc | 24 | 1440 | YES | Day28 | MAC3 | Phone_abc |
| MAC1 | Day8 | Phone_abc | 24 | 1440 | YES | Day28 | MAC3 | Phone_abc |
| MAC1 | Day9 | Phone_abc | 24 | 1440 | YES | Day28 | MAC3 | Phone_abc |
| MAC1 | Day10 | Phone_abc | 24 | 1440 | YES | Day28 | MAC3 | Phone_abc |
| MAC1 | Day11 | Phone_abc | 11 | 660 | YES | Day28 | MAC3 | Phone_abc |
| MAC2 | Day11 | Phone_abc | 14 | 840 | YES | Day28 | MAC3 | Phone_abc |
| MAC2 | Day12 | Phone_abc | 24 | 1440 | YES | Day28 | MAC3 | Phone_abc |
| MAC2 | Day13 | Phone_abc | 24 | 1440 | YES | Day28 | MAC3 | Phone_abc |
| MAC2 | Day14 | Phone_abc | 24 | 1440 | YES | Day28 | MAC3 | Phone_abc |
| MAC2 | Day15 | Phone_abc | 24 | 1440 | YES | Day28 | MAC3 | Phone_abc |
| MAC2 | Day16 | Phone_abc | 24 | 1440 | YES | Day28 | MAC3 | Phone_abc |
| MAC2 | Day17 | Phone_abc | 24 | 1440 | YES | Day28 | MAC3 | Phone_abc |
| MAC2 | Day18 | Phone_abc | 24 | 1440 | YES | Day28 | MAC3 | Phone_abc |
| MAC2 | Day19 | Phone_abc | 13 | 780 | YES | Day28 | MAC3 | Phone_abc |
| MAC3 | Day19 | Phone_abc | 12 | 720 | YES | Day28 | MAC3 | Phone_abc |
| MAC3 | Day20 | Phone_abc | 24 | 1440 | YES | Day28 | MAC3 | Phone_abc |
| MAC3 | Day21 | Phone_abc | 24 | 1440 | YES | Day28 | MAC3 | Phone_abc |
| MAC3 | Day22 | Phone_abc | 24 | 1440 | YES | Day28 | MAC3 | Phone_abc |
| MAC3 | Day23 | Phone_abc | 24 | 1440 | YES | Day28 | MAC3 | Phone_abc |
| MAC3 | Day24 | Phone_abc | 24 | 1440 | YES | Day28 | MAC3 | Phone_abc |
| MAC3 | Day25 | Phone_abc | 24 | 1440 | YES | Day28 | MAC3 | Phone_abc |
| MAC3 | Day26 | Phone_abc | 24 | 1440 | YES | Day28 | MAC3 | Phone_abc |
| MAC3 | Day27 | Phone_abc | 24 | 1440 | YES | Day28 | MAC3 | Phone_abc |
| MAC3 | Day28 | Phone_abc | 24 | 1440 | YES | Day28 | MAC3 | Phone_abc |

Figure 7

| KPI Merged Table | | | |
|---|---|---|---|
| CalculationDate | Unique Identifier | Unique Hostname | Total Active Time |
| Day 28 | MAC3 | Phone_abc | 40440 |

Figure 8

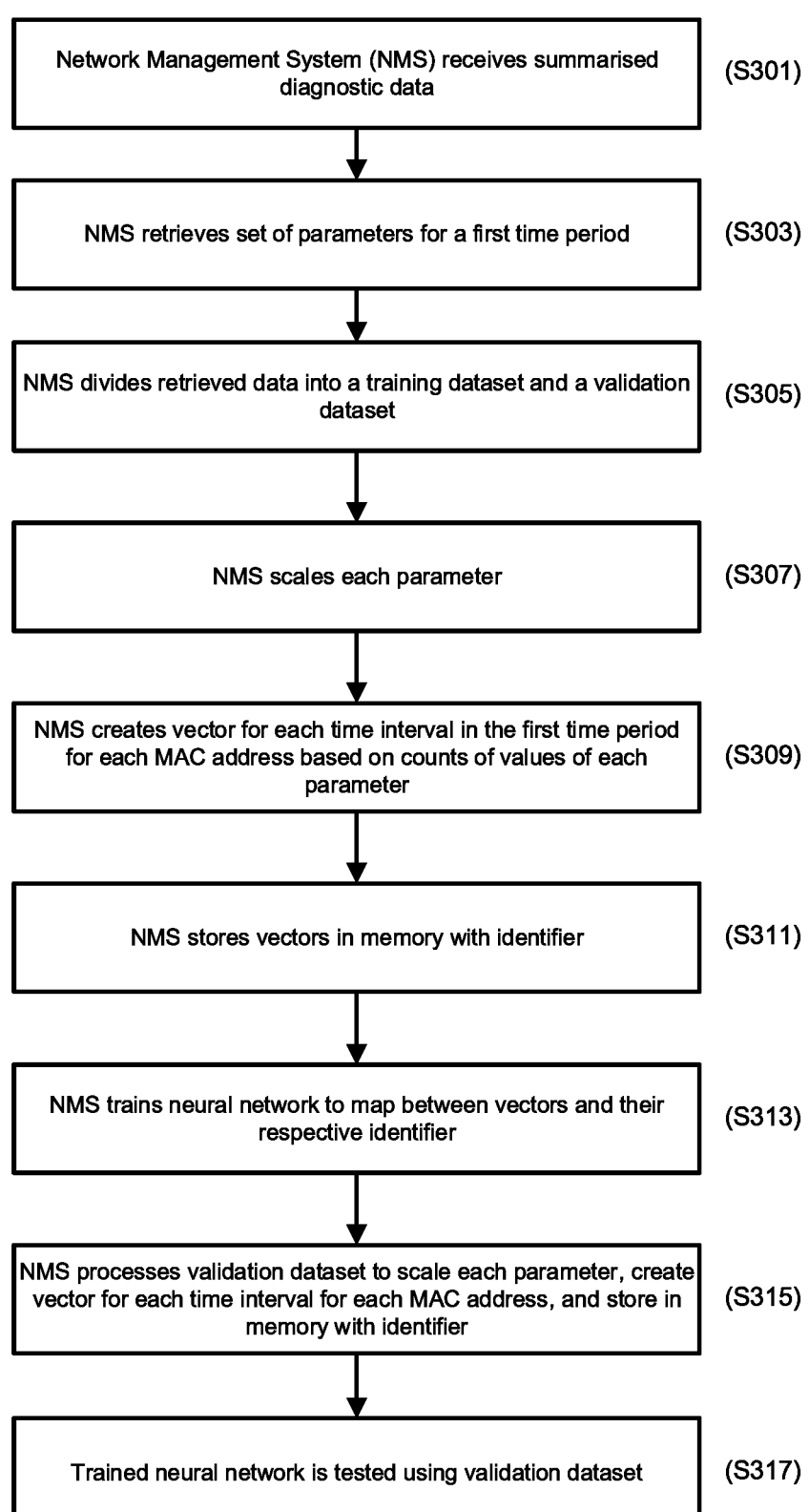

| | |
|---|---|
| Network Management System (NMS) receives summarised diagnostic data | (S301) |
| NMS retrieves set of parameters for a first time period | (S303) |
| NMS divides retrieved data into a training dataset and a validation dataset | (S305) |
| NMS scales each parameter | (S307) |
| NMS creates vector for each time interval in the first time period for each MAC address based on counts of values of each parameter | (S309) |
| NMS stores vectors in memory with identifier | (S311) |
| NMS trains neural network to map between vectors and their respective identifier | (S313) |
| NMS processes validation dataset to scale each parameter, create vector for each time interval for each MAC address, and store in memory with identifier | (S315) |
| Trained neural network is tested using validation dataset | (S317) |

Figure 9

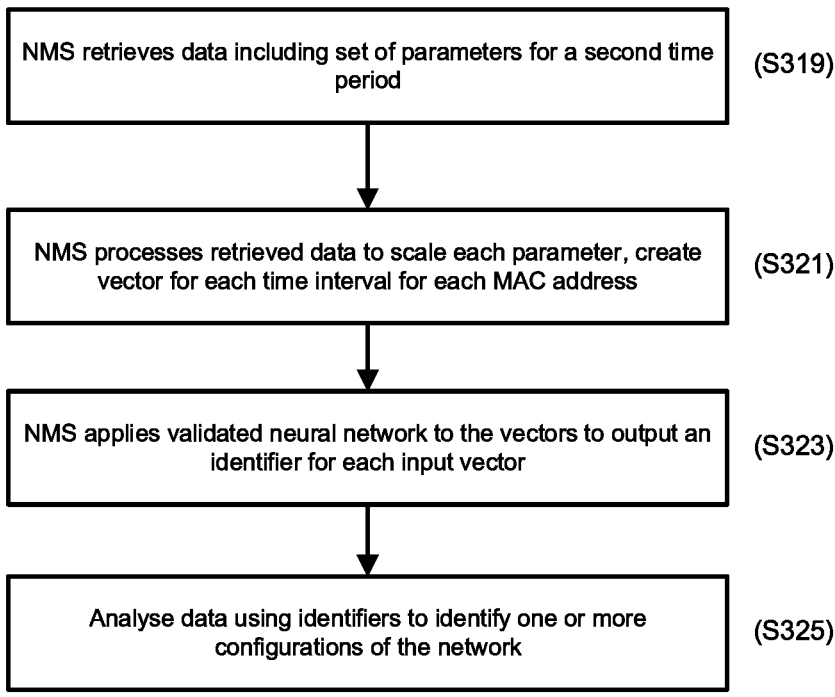

| | |
|---|---|
| NMS retrieves data including set of parameters for a second time period | (S319) |
| NMS processes retrieved data to scale each parameter, create vector for each time interval for each MAC address | (S321) |
| NMS applies validated neural network to the vectors to output an identifier for each input vector | (S323) |
| Analyse data using identifiers to identify one or more configurations of the network | (S325) |

Figure 10

SYSTEMS AND METHODS FOR MANAGING MEDIA ACCESS CONTROL (MAC) ADDRESSES IN WIRELESS NETWORKS

PRIORITY CLAIM

The present application is a National Phase entry of PCT Application No. PCT/EP2022/086247, filed Dec. 15, 2022, which claims priority from GB Application No. 2200253.9, filed Jan. 10, 2022, each of which hereby fully incorporated herein by reference.

TECHNICAL FIELD

The present disclosure relates to a telecommunications network.

BACKGROUND

A Customer Premises Equipment (CPE) in a telecommunications network is a device typically located in a customer's home or business that connects the customer to an operator's network (such as a Digital Subscriber Line (DSL) network, a Fiber To The Premises (FTTP) network, and/or a cellular network). The CPE may also provide the customer with a local area network (including a wireless local area network) to connect one or more devices to the network operator's network.

A CPE may be remotely managed by the operator. Remote management may be implemented by an Auto-Configuration Server (ACS) using the TR-69 protocol (as standardized by the Broadband Forum). The TR-69 protocol defines a dataset that is periodically collected from the CPE for analysis by the ACS. This dataset identifies all devices connected to the CPE. The ACS analyses this data as part of a management service (e.g. to identify faults).

The dataset collected under the TR-69 protocol identifies each device connected to the hub by its Media Access Control (MAC) address. However, some devices now change their MAC address based on a MAC randomization process. MAC randomization is a process in which the device uses a randomly generated MAC address, instead of its actual MAC address, when communicating with other devices in a network. One of the first uses of MAC randomization was for devices to transmit a randomly generated MAC address as part of a probe request message when scanning for network access points, but use their actual MAC address when connecting to one of those network access points. This process was subsequently developed so that a device would connect to a network access point using a MAC address randomly generated for that network (such that the device uses a different randomly generated MAC address for each network it connects to). Each network would thereafter identify that device by its network-specific randomly generated MAC address. This process has more recently been developed so that a device, once connected to a network, periodically (e.g. once per day) updates this identifier in the network with a new randomly generated MAC address. This may be implemented by reconnecting to the network with a new, randomly generated MAC address.

This periodic MAC randomization process creates a technical problem in that the MAC address can no longer be used as a persistent identifier for a device over a time-period that is greater than the periodicity of the MAC randomization. For example, if a first record in a network-specific dataset is collected prior to an instance of a periodic MAC randomization process and a second record in the same network-specific dataset is collected following that MAC randomization instance, then it cannot be determined whether those records relate to two separate devices or to the same device that has performed a MAC randomization. This problem applies to the dataset collected using the TR-69 protocol, but also applies to any other dataset which identifies each device connected to a particular network by its MAC address. When applied to the TR-69 dataset, the operator's management processes (such as fault identification and/or network optimization) may suffer as a result.

SUMMARY

According to a first aspect of the disclosure, there is provided a method of analyzing a wireless local area network, the wireless local area network including a plurality of devices wherein at least one device of the plurality of devices is configured to change its Media Access Control, MAC, address, the method comprising obtaining training data including a plurality of records, wherein each record of the plurality of records relates to a device of the plurality of devices, the training data specifying, for each record: a MAC address, and a set of performance metrics; training a machine learning model, based on the obtained training data, to output a MAC address based on the set of performance metrics; obtaining further data including a plurality of records, wherein each record of the plurality of records relates to a device of the plurality of devices and includes a set of performance metrics; determining a MAC address for each record of the further data by inputting the set of performance metrics of the further data to the trained machine learning model; and analyzing the set of performance metrics for a plurality of records of the further data having the same determined MAC address.

The set of performance metrics may include performance metrics for three parameters, which may be downlink physical layer rate, received signal strength indicator, and uplink physical layer rate.

The method may further comprise causing a configuration of a device of the plurality of devices based on the analysis.

According to a second aspect of the disclosure, there is provided a computer program comprising instructions which, when the program is executed by a computer, cause the computer to carry out the first aspect of the disclosure. The computer program may be stored on a computer readable carrier medium.

According to a third aspect of the disclosure, there is provided a data processing apparatus comprising a processor adapted to perform the method of the first aspect of the disclosure.

BRIEF DESCRIPTION OF THE FIGURES

In order that the present disclosure may be better understood, embodiments thereof will now be described, by way of example only, with reference to the accompanying drawings in which:

FIG. 3 is a flow diagram of the method of the first embodiment of the present disclosure, implemented by a Network Management System (NMS) of the network of FIG. 1.

FIG. 4 is an example data extract of a key performance indicator table during implementation of the first embodiment of the method of the present disclosure FIG. 5 is an example data extract of a daily hostname count table during implementation of the first embodiment of the method of the present disclosure.

FIG. 6 is an example data extract of a hostname uniqueness table during implementation of the first embodiment of the method of the present disclosure.

FIG. 7 is a first example data extract of a key performance indicator merged table during implementation of the first embodiment of the method of the present disclosure.

FIG. 8 is a second example data extract of a key performance indicator merged table during implementation of the first embodiment of the method of the present disclosure.

FIG. 9 is a flow diagram of the method of the second embodiment of the present disclosure.

FIG. 10 is a flow diagram of the method of the second embodiment of the present disclosure.

DETAILED DESCRIPTION OF EMBODIMENTS

Figure 1:
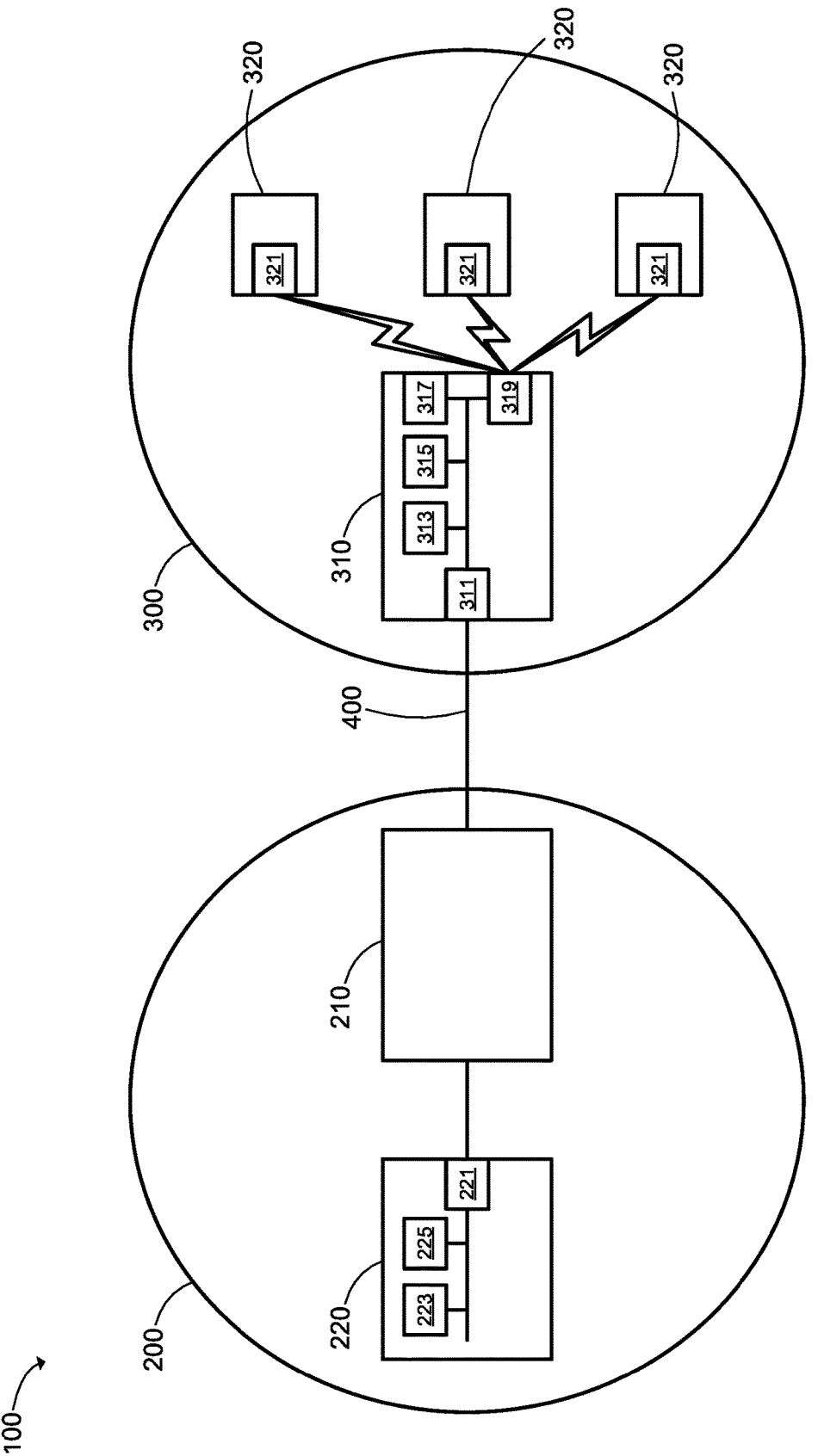
FIG. 1 is a schematic diagram of a telecommunications network of a first and second embodiment of the present disclosure.

A first embodiment of a telecommunications network 100 will now be described with reference to FIG. 1. The telecommunications network 100 includes an operator's network 200 and a customer's network 300. The operator's network 200 and customer's network 300 are connected by an access connection 400, which in this embodiment is a Digital Subscriber Line (DSL). The customer's network 300 includes a Customer Premises Equipment (CPE) 310 and a plurality of user devices 320.

The CPE 310 includes an access network communications interface 311, a processor 313, memory 315, a wired communications interface 317 and a wireless communications interface 319. The access network communications interface 311 enables the CPE 310 to communicate with the operator's network 200 via the access connection 400. The wired and wireless communications interfaces 317, 319 respectively enable the CPE 310 to provide a wired local area network and a wireless local area network.

In this embodiment the plurality of user devices 320 each include a wireless communications interface 321 (for communicating with the wireless local area network of the CPE 310).

The CPE 310 is identifiable by a MAC address for a Network Interface Controller (NIC) associated with its access network communications interface 311. Each user device of the plurality of user devices 320 is identifiable by a MAC address of a NIC associated with its respective communications interface 321.

The operator's network 200 includes an access network communications node 210 and a Network Management System (NMS) 220. The access network communications node 210 enables the NMS 220 (and any other node of the operator's network, or any node in an external network connected to the operator's network) to communicate with the CPE 310 via the access connection 400. The NMS 220 includes a communications interface 221, a processor 223 and a memory 225.

Figure 2:
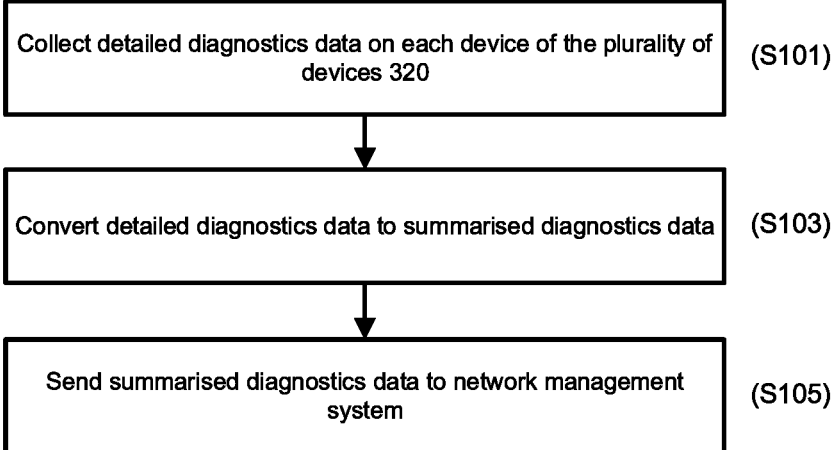
FIG. 2 is a flow diagram of a method of a first and second embodiment of the present disclosure, implemented by a Customer Premises Equipment (CPE) of the network of FIG. 1.

A first embodiment of a method of the present disclosure will now be described with reference to FIGS. 2 to 8. FIG. 2 illustrates operations performed by the CPE 310's processing and memory modules 313 and 315, and FIG. 3 illustrates operations performed by the NMS 220's processing and memory modules 223 and 225.

In S101 of the first process, the CPE's processor 313 implements a diagnostics function to collect data on each device of the plurality of devices 320. This data is collected periodically and this periodicity may be remotely configured by the network operator (this periodicity may be in a range from a hundred milliseconds to every ten seconds). Each record in the data includes the MAC address of the user device, a timestamp representing the time the data was collected from the user device, a hostname of the user device, and parameters of the user device. These parameters include Received Signal Strength Indicator (RSSI), downlink physical layer (PHY) rate, and uplink PHY rate. The parameters of the user device may also include:

A wireless local area network channel number;

A system name of the access point (which may be different from the name of the CPE where the CPE is a root access point in a mesh wireless local area network);

Downlink packet counter values;

Uplink packet counter values;

Retransmission counter values; and

Total active time.

This data is hereinafter referred to as detailed diagnostics data. The detailed diagnostics data is stored in the CPE's memory 315.

In S103, the CPE's processor 313 implements a compression function to convert the detailed diagnostics data into summarized diagnostics data. The detailed diagnostics data is converted to summarized diagnostics data periodically and this periodicity may be remotely configured by the network operator (this periodicity may be in the range from one minute to 10 minutes). The conversion may be implemented by applying one or more statistical functions to the detailed diagnostics data, such as a summation, average, maximum, or minimum of each parameter of the user device. The summarized diagnostic data is also stored in the CPE's memory 315.

In S105, the CPE transmits the summarized diagnostic data to the NMS (that is, via the access connection 400). Turning to FIG. 3, in S201, the NMS 220 receives the summarized diagnostic data and stores it in memory 225. S101 to S105 and S201 are performed periodically such that the NMS 220 collects additional records and adds them to the summarized diagnostic data already stored in memory 225. In this embodiment, the summarized diagnostic data stored in memory 225 spans a time period that is greater than the MAC randomization time period implemented by one or more user devices of the plurality of user devices 320.

The NMS 220 stores a first and second table based on the summarized diagnostic data. The first table—a key performance indicator table—includes values for one or more key performance indicators for each user device of the plurality of user devices 320. These key performance indicators include, for example, a total active time, total poor RSSI time, and total poor coverage time (which may be calculated from the summarized diagnostic data). The key performance indicator table includes the MAC address and hostname as identifiers of the user device. The key performance indicator table is updated with new records when additional records are added to the summarized diagnostic data. In this embodiment, the key performance indicator table is updated with new records for the past 28 days (such that any data older than 28 days is removed).

An example key performance indicator table—having a single key performance indicator for total active time—is shown in FIG. 4. It is noted, for the sake of clarity, that placeholder MAC addresses (MAC1, MAC2, MAC3) are used, and these are not in the form of real MAC addresses.

The second table—a daily hostname count table is populated with records as described in S203 below. This first embodiment allows the NMS 220 to determine whether multiple records of the key performance indicator table having different MAC addresses relate to the same user device and, if so, merge those records of the key performance indicator table.

In S203, the NMS processor 223 retrieves data for the current day in the summarized diagnostic data table and processes the retrieved data to calculate, for each distinct hostname in the retrieved data, a first count—named SampleCount—being a count of all records in the retrieved data having that hostname, and a second count—named UniqueTimeStampCount—being a count of all distinct timestamps of the subset of records in the retrieved data having that hostname. The daily hostname count table is updated with an entry for each distinct hostname with its Sample-Count and UniqueTimeStampCount values. Each record contains a further field—CalculationDate—identifying the day the SampleCount and UniqueTimeStampCount values were calculated.

The daily hostname count table includes records for each hostname for each day of a time period, which in this embodiment is 28 days (that is, the above process was implemented in each of the past 28 days so as to record the SampleCount and Unique TimeStampCount values for each distinct hostname in each of the past 28 days).

An example daily hostname count table is shown in FIG. 5. In day 11 of this example, the SampleCount value is 25 and the UniqueTimeStampCount is 24. This may be calculated where there is MAC randomization event on day 11 such that there are two records using the same timestamp, but different MAC addresses, for the same hostname.

In S205, the NMS processor 223 retrieves data for the past 28 days in the daily hostname count table. The NMS processor 223 processes the retrieved data to identify each distinct hostname and calculate, for each distinct hostname, a uniqueness ratio. The uniqueness ratio is calculated as the sum of SampleCount over the 28 days for that hostname divided by the sum of UniqueTimeStampCount over the 28 days for that hostname. NMS processor 223 creates a third table—a hostname uniqueness table—which includes a record for each distinct hostname and further indicates, for each distinct hostname, a binary IsUnique field to indicate whether the uniqueness ratio for that hostname is below a uniqueness threshold (e.g. 1.05 or 1.1). Each record contains a further field—CalculationDate—identifying the day the record is created.

An example hostname uniqueness table is shown in FIG. 6.

In S207, NMS processor 223 joins the key performance indicator table and the hostname uniqueness table on the hostname field to create a new table—the key performance indicator merged table. The key performance indicator merged table includes all fields from the key performance indicator table and, for that hostname, the IsUnique and CalculationDate fields from the hostname uniqueness table.

In S209, NMS processor 223 processes all records in the key performance indicator merged table to create two new fields—unique identifier and unique hostname. The unique identifier field is determined based on the following logic:

1. If the MAC address of the record in the key performance indicator merged table is a global (also known as universal) MAC address, which may be determined if the second character is not equal to one of 2, 4, A or E, then the unique identifier is set equal to the MAC address;

2. If the MAC address of the record in the key performance indicator merged table is a local MAC address, which may be determined if the second character is equal to one of 2, 4, A or E, and the IsUnique value for the hostname of the record in the key performance indicator merged table is YES, then the unique identifier is set equal to the most recent MAC address for that hostname (that is, the MAC address of a record of the key performance indicator merged table using the same hostname and having the latest timestamp value); and 3. If the MAC address of the record in the key performance indicator merged table is a local MAC address and the IsUnique value for the hostname of the record in the key performance indicator merged table is NO, or there is no hostname value in the record in the key performance indicator merged table, then the unique identifier is set as NULL.

The unique hostname is determined based on the following logic:

1. If the MAC address of the record in the key performance indicator merged table is a global MAC address, then the unique hostname is set equal to the most recent hostname for that MAC address (that is, the hostname of a record of the key performance indicator table using the same MAC address and having the latest timestamp value);

2. If the MAC address of the record in the key performance indicator merged table is a local MAC address and the IsUnique value for the hostname of the record in the key performance indicator merged table is YES, then the unique hostname is set equal to the hostname of that record in the key performance merged table; and 3. If the MAC address of the record in the key performance indicator merged table is a local MAC address and the IsUnique value for the hostname of the record in the key performance indicator merged table is NO, or there is no hostname value in the record in the key performance indicator merged table, then the unique hostname is set as NULL.

An example of the key performance indicator merged table following S209 is shown in FIG. 7.

In S211, NMS processor 223 groups records in the key performance indicator merged table having the same (non-NULL) unique identifier and same (non-NULL) unique hostname such that the key performance indicator values are combined (e.g. summed).

An example of the key performance indicator merged table following S211 is shown in FIG. 8.

In S213, NMS processor 223 identifies one or more configurations for the network by analyzing data in the key performance indicator merged table. These reconfigurations may be, for example, updating Quality of Service (QoS) parameters for the most active set of devices (that is, those having the greatest "total active time" value), updating steering policies for the most active set of devices, and/or reconfiguring a transmission property of the access point (or set of access points in a mesh network) based on a coverage KPI indicator.

The process may then loop back to S201 for a subsequent performance on the next day. On the next day, the NMS 220 receives additional data to be added to the summarized diagnostic data. The key performance indicator table and daily hostname count table are then updated based on the most recent 28 days of summarized diagnostic data. The remaining operations of the above first embodiment may then be performed on the updated records.

The above first embodiment enables the NMS 220 to determine when multiple records having different MAC addresses relate to the same user device. This is achieved by determining that the hostname associated with those multiple records is sufficiently unique and using the most recent MAC address associated with that hostname as a unique identifier. All records in the key performance indicator table that use that unique hostname may then be analyzed as relating to a single user device.

In the above embodiment, the dataset included records for a single CPE. However, the skilled person will understand that the NMS 220 may collect data from multiple CPEs, and the same method may be applied to this multiple-CPE dataset (e.g. by isolating data for a particular CPE based on a CPE identifier, such as a serial number, and applying the same method to the dataset for that particular CPE).

The skilled person will understand that the first embodiment may be applied when a user device is identified by another form of persistent device label, such as a server name or fully qualified domain name. Furthermore, the first embodiment may be applied in any scenario where a dataset for a CPE's network identifies a user device by its MAC address and device label and that MAC address may change.

A second embodiment of a method of the present disclosure will now be described with reference to FIGS. 2, 9, 10 and 11. This second embodiment utilizes the same telecommunications network as described in FIG. 1. In this second embodiment, the CPE 310 performs the same process as illustrated in FIG. 2 such that it sends summarized diagnostic data to the NMS 220. In this embodiment, NMS 220 performs the following machine learning process to determine that multiple records having different MAC addresses relate to the same user device.

In S301, as illustrated in FIG. 9, the NMS 220 receives summarized diagnostic data and stores it in memory 225. In S303, NMS processor 223 retrieves the MAC address, RSSI, downlink PHY rate, and uplink PHY rate of each record for a first time period (this may be limited to those records of the key performance indicator table—in the first embodiment above—where the unique identifier and unique hostname fields are NULL). This first time period is selected such that it is less than a MAC randomization time period of any one of the user devices. For example, if the MAC randomization time period is such that one or more user devices updates its MAC address once every 24 hours, then the time period of the retrieved data is less than 24 hours (e.g. 12 hours, 8 hours, or 6 hours).

In S305, NMS processor 223 divides the retrieved data into a training dataset and a validation dataset. In S307, NMS processor 223 determines the minimum and maximum values of each parameter for all records in the training dataset, and scales the values of each parameter of each record independently between 0 and 1 based on their original value and the minimum and maximum values.

In S309, NMS processor 223 processes the training dataset to determine a count of values of each parameter in consecutive non-overlapping intervals of 0.1 (that is, 0 to 0.1, 0.1 to 0.2, . . . , 0.9 to 1) for each MAC address for a plurality of time intervals (that is, a first hour, a second hour, etc.) in the time period.

Figure 11:
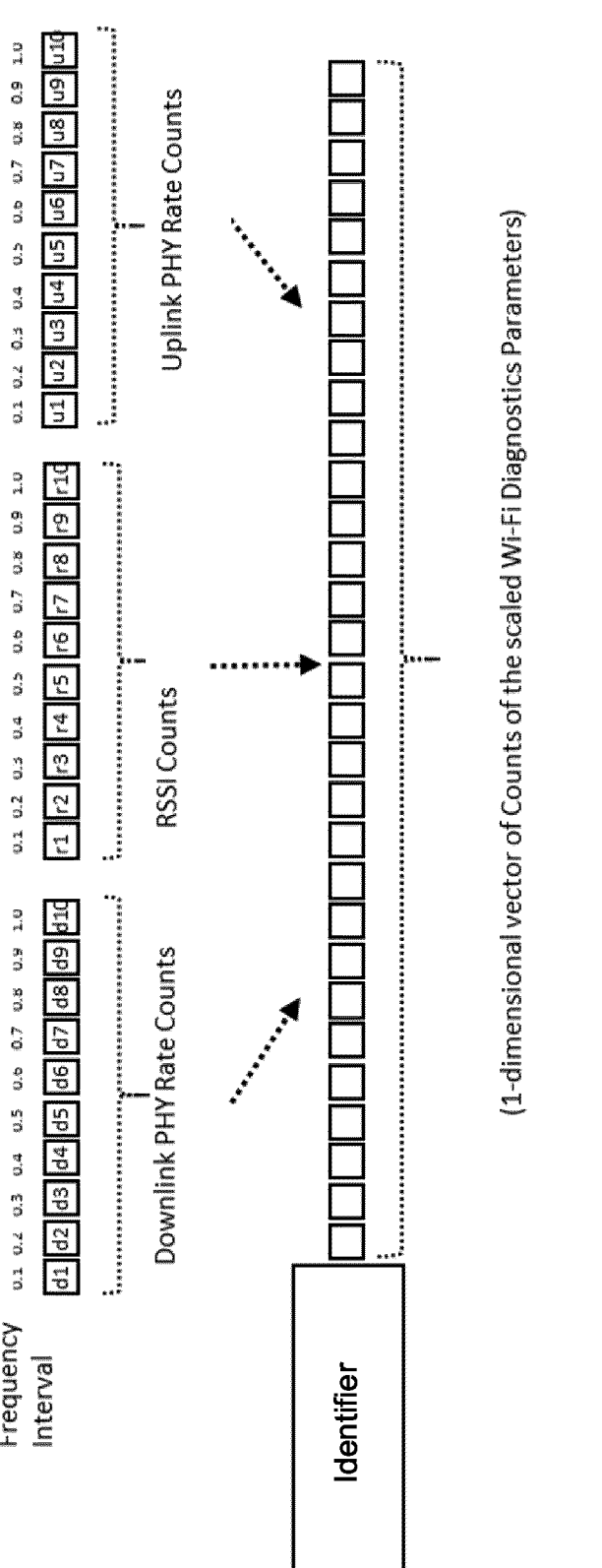
FIG. 11 is a representation of an input vector used in the method of the second embodiment of the present disclosure.

The NMS processor 223 therefore determines, for a first MAC address for a first hour in the time period, a count of values of each parameter between 0 and 0.1, a count of values of each parameter between 0.1 and 0.2, and so on; determines, for the first MAC address for the second hour in the time period, a count of values of each parameter between 0 and 0.1, a count of values of each parameter between 0.1 and 0.2, and so on. A 1-dimensional vector is created for each MAC address in the training dataset for each hour in the time period, which contains the counts of downlink PHY rate in each interval from 0 to 0.1 to 0.9 to 1, the counts of RSSI in each interval from 0 to 0.1 to 0.9 to 1, and the counts of uplink PHY rate in each interval from 0 to 0.1 to 0.9 to 1. An example of this vector being constructed from these counts is illustrated in FIG. 11. In S311, these vectors for the training dataset are stored and each associated with an identifier, the identifier being unique to the MAC address (and therefore the user device) from which the vector was derived in S309.

In S313, a neural network is trained to map between the vectors of the training dataset and the associated identifier. In this second embodiment, the "neuralnet" library of the R programming language was used in which the input layer consists of the vectors, the output layer consists of the identifiers associated with the vectors, and the hidden layer has a number of dimensions that is greater than a count of distinct identifiers and less than a count of elements in the vector (that is, 30 in this example in which each vector contains 10 intervals for each of the three parameters). In more detail, the neuralnet parameters are selected as follows:

Sigmoid/Activation function: Logistic (although ReLu and tanh may be used instead);

Repetitions: 1 (although this may be in the range of 1 to 5);

Minimum threshold: 1e−4 (although this may be in the range of 1e−3 to 1e−5);

Learning rate: 0.01 (although this may be in the range of 0.005 to 0.03);

Error function: Sum of Squared Error (SSE) (although cross-entropy may be used instead); and Number of time intervals: 24 (although 5 to 15 may be used instead)

It is noted that the above process is performed on summarized diagnostic data for a particular CPE, such that the neural network is trained for that particular CPE. If the NMS 220 receives data from multiple CPEs, then the above process is performed on the subset of data relating to a particular CPE (that is, by retrieving data in S301 relating to that particular CPE by using a unique identifier for that CPE, such as its serial number) such that the remaining operations train a neural network for that particular CPE. The neural network may also be retrained periodically, such as every hour, based on the most recent data in the summarized diagnostic data.

In S315, the NMS processor 223 processes the validation dataset in the same way as described above in S307 to S311 (i.e. NMS processor 223 scales the values of each parameter of each record in the validation dataset, creates vectors for each MAC address, and stores each vector in memory with an associated identifier, the identifier being unique to the MAC address). In S317, the trained neural network is tested using the vectors of the validation dataset as input. If the performance of the trained neural network satisfies a threshold (based on a comparison of the output of the trained neural network with the identifiers associated with each vector in the validation dataset), then the trained neural network is validated and may be used in the subsequent operations of this second embodiment. If the performance of the trained neural network does not satisfy the threshold, then the neural network may be retrained (for example, by using different training data and/or different neuralnet parameters).

Turning to FIG. 10, in S319, NMS processor 223 retrieves data from the summarized diagnostic data covering the RSSI, downlink PHY rate and uplink PHY rate of each record for a second time period. This second time period is now greater than the MAC randomization time period of one or more of the user devices, such that multiple records relating to the same device may have different MAC addresses such that it cannot be determined, based on those records alone, whether those multiple records relate to the same user device or not. To solve this problem, in S321, NMS processor 223 processes the data retrieved in S319 in the same way as described above in S307 to S309 (i.e. NMS processor 223 scales the values of each parameter of each record in the retrieved data, and creates vectors for each MAC address). In S323, NMS processor 223 applies the validated neural network to the data (retrieved in S319 and processed in S321), which outputs an identifier for each input vector. This identifier therefore identifies all records in the data that relate to the same device, even if they use different MAC addresses. In S325, the data may be analyzed with this identifier (and this analysis may involve other parameters that did not form part of the vector) to identify one or more reconfigurations of the telecommunications network. This analysis may be, for example:

> to create coverage indicators for the CPE based on the RSSI values of each user device, which may be used to reconfigure a transmission parameter of the CPE;

> to create usage patterns, roaming behavior patterns, and other key performance indicators for each user device, which may be used to identify high-usage devices and/or problematic devices and assign new QoS parameters and/or new steering policies for those devices.

The skilled person will understand that it is non-essential that the neuralnet library of the R programming language is used, and that any suitable machine learning process may be used instead (including a support vector machine, random forest, or other form of neural network, such as a convolutional neural network or a recurrent neural network). The data preparation stages of S303 to S311 may still be applied when using these other machine learning processes.

In the above embodiments, the CPE 310 and access network communications node 210 are connected by a DSL. However, this is non-essential and other forms of access connection, such as fixed wireless access or FTTP, may also be used.

The invention claimed is:

1. A method of analyzing a wireless local area network, the wireless local area network including a plurality of devices, wherein at least one device of the plurality of devices is configured to change a Media Access Control (MAC) address, the method comprising:

obtaining training data including a plurality of records, wherein each record of the plurality of records in the training data relates to a respective device of the plurality of devices, the training data specifying, for each record:

a respective MAC address, and a respective set of performance metrics comprising a downlink physical layer rate, a received signal strength indicator, and an uplink physical layer rate;

training a machine learning model, based on the obtained training data, to map the respective MAC address to the respective set of performance metrics; and then:

obtaining further data including a further plurality of records, wherein each record of the further plurality of records in the further data relates to a respective device of the plurality of devices and includes a further respective set of performance metrics, wherein the at least one device has changed the MAC address;

determining the respective MAC address for each record of the obtained further data by inputting the further respective set of performance metrics of the further data to the trained machine learning model such that the trained machine learning model maps the further set of performance metrics to the respective MAC address;

analyzing the further respective set of performance metrics for the further plurality of records of the further data having a same determined MAC address to identify one or more potential reconfigurations of one or more of the plurality of devices to improve performance of the wireless local area network; and implementing at least one of the one or more identified potential reconfigurations of the one or more of the plurality of devices.

2. The method as claimed in claim 1, wherein the one or more identified potential reconfigurations of the one or more of the plurality of devices includes updating a Quality of Service (QoS) parameter; updating a steering policy; or reconfiguring a transmission parameter.

3. A system comprising at least one processor and memory storing instructions which, when the instructions are executed by the at least one processor, cause the at least one processor to carry out the method of claim 1.

4. A non-transitory computer readable storage medium comprising instructions which, when executed by a computer, cause the computer to carry out the method of claim 1.

5. A data processing apparatus comprising a processor adapted to perform the method of claim 1.

* * * * *